(12) United States Patent
Arai et al.

(10) Patent No.: US 6,766,894 B2
(45) Date of Patent: Jul. 27, 2004

(54) SUSPENSION CONVEYANCE SYSTEM

(75) Inventors: Masao Arai, Osaka (JP); Tatsuhiko Sakata, Osaka (JP); Toshiro Yoneoka, Toyota (JP); Kei Nakamuta, Toyota (JP)

(73) Assignee: Daifuku Co., Ltd., Osaka (JP)

( * ) Notice: Subject to any disclaimer, the term of this patent is extended or adjusted under 35 U.S.C. 154(b) by 90 days.

(21) Appl. No.: 10/186,983

(22) Filed: Jul. 1, 2002

(65) Prior Publication Data

US 2003/0000413 A1 Jan. 2, 2003

(30) Foreign Application Priority Data

Jun. 29, 2001 (JP) ........................................ 2001-197575

(51) Int. Cl.[7] .............................................. B65G 29/00
(52) U.S. Cl. .................................................. 198/465.4
(58) Field of Search ........................... 198/345.1, 345.2, 198/465.4, 678.1, 680

(56) References Cited

U.S. PATENT DOCUMENTS 4,462,315 A * 7/1984 Wakabayashi ....... 198/465.4 X

FOREIGN PATENT DOCUMENTS

| EP | 552711 | * | 7/1993 | ............... 198/465.4 |
| GB | 2221202 | * | 1/1990 | ............... 198/465.4 |
| JP | 59-74816 | * | 4/1984 | ............... 198/465.4 |
| JP | 06156662 A | | 6/1994 | |
| JP | 07089609 A | | 4/1995 | |

* cited by examiner

*Primary Examiner*—James R. Bidwell
(74) *Attorney, Agent, or Firm*—D. Peter Hochberg; Sean Mellino; Katherine R. Vieyra

(57) ABSTRACT

A movable body movable on a given path is provided with a support section for an object to be carried. Supports for supporting an object to be carried are disposed in the lower portion of the support section on the right and left sides thereof such that a support position can be changed. The given path is provided with a changer positioned between the right and left supports for changing the support position provided by the supports. The movable body is moved until it is stopped with the now-empty support section opposite the changer. The changer is then actuated, thereby changing the support position provided by the supports. Thus, different kinds of objects to be carried can each be stably supported. The common changer simplifies the configuration and operation and enables the support position provided by the right and left supports to be changed quickly and reliably.

4 Claims, 9 Drawing Sheets

F I G. 11
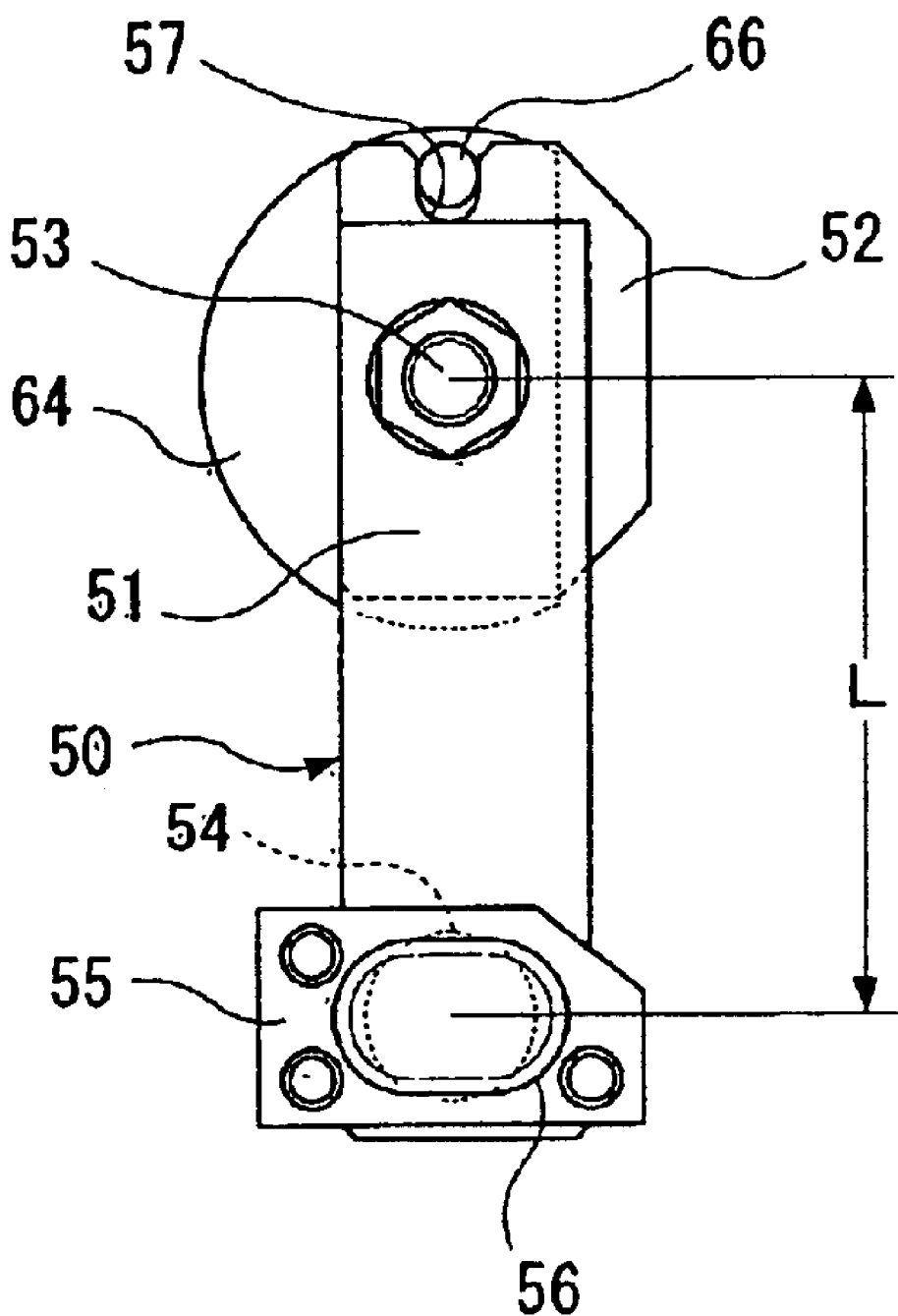

SUSPENSION CONVEYANCE SYSTEM

FIELD OF THE INVENTION

The present invention relates to a suspension conveyance system used, for example, to support car bodies in factories manufacturing automobiles or to support and carry objects to be worked in various factories.

BACKGROUND OF THE INVENTION

As for suspension conveyance systems of this type, there has heretofore been provided an arrangement found, for example, in Japanese Kokai (unexamined) Publication No. 6-156662. In this conventional arrangement, the main body frame of an overhead hanger carried on a given line is provided with receiving elements on the front and rear sides, respectively, for supporting a car body. Of both receiving elements, the one on the front side is fixed and the other, which forms a pair on the rear side, are respectively rotatably supported with respect to the main body frame side.

That is, a receiving-element support member is fixed on the main body frame side. This receiving-element support member has a shaft fitted therein, which shaft is rotatable and axially movable. The shaft has an eccentric position of the receiving element fixed at the upper end thereof and a rotary piece fixed at the lower end thereof In addition, the rotary piece is formed with a pair of driving holes which are symmetrically disposed, while the receiving-element support member is provided with a position holder.

Disposed at predetermined places in the line are front end pressing means, intermediate pressing means, and rear end pressing means, which are operable with respect to the main body frame side. Also disposed is an automatic switching device consisting of a releasing means and a rotating means.

With such a conventional arrangement, the overhead hanger is carried on the line and is brought to a stop with the receiving elements, now empty, on the rear side opposed to the automatic switching device. First, swing prevention of this main body frame side is effected by causing the front end pressing means, intermediate pressing means and rear end pressing means to act on the main body frame side. Then, the releasing means in the automatic switching device is lifted, and with its driving pin fitted in the driving hole, the receiving elements are lifted through the rotary piece and shaft so as to bring the positioning effected by the position holder in an open state. In this state, the receiving elements are rotated by the operation of the rotating means through the driving pin, rotary piece, shaft and the like. Thereafter, the receiving element side is lowered for the position holder to effect positioning. In this manner, the attitude of the receiving elements on the rear side is changed by the automatic switching device.

According to the conventional arrangement described above, however, since the automatic switching device is arranged to change the attitude of the corresponding rear side receiving elements by operating the pair of releasing means and rotating means, there have been such problems that the arrangements and operations become complicated.

SUMMARY OF THE INVENTION

Accordingly, an object of the invention is to provide a suspension conveyance system capable of changing support positions of right and left supports by a common changing means.

To achieve the object described above, a suspension conveyance system according to the invention comprises a movable body movable on a given path, the movable body having a support section for an object to be carried, and supports for supporting the object from below which are disposed in a lower portion of the support section on right and left sides of the support section such that a support position can be changed, wherein the given path includes therein a changing means disposed between the right and left supports to change the support position provided by the supports.

According to the above arrangement of the invention, the movable body is moved until it is stopped with the support section, now empty, opposed to the changing means, and then the changing means is activated, thereby changing the support position provided by the support members. Thus, a plurality of kinds of objects to be carried can each be supported in a stable manner. The use of the common (single) changing means simplifies the construction and operation and ensures that the change of the support position provided by the right and left support members is effected quickly and reliably.

In a first embodiment of a suspension conveyance system according to the invention, the changing means is movable between an operating position in the given path and a retreat position outside the given path.

According to this first embodiment, the changing means performs the operation of changing the support position provided by the support members in an operating position, but when not performing such operation, it is moved to the retreat position, whereby the maintenance, inspection, repair and the like, of the changing means can be effected without stopping the movement of the movable body on the given path and without involving any trouble.

In a second embodiment of a suspension conveyance system according to the invention, there is a positioning means for positioning the support members when the movable body is stopped at a position where it is opposed to the changing means in the given path.

Therefore, according to the second embodiment, the support position provided by the supports can be changed quickly and reliably by the changing means with respect to the support section which has effected positioning (swing prevention) by the positioning means after the movable body has been stopped.

In a third embodiment of a suspension conveyance system according to the invention, there are stock sections for the support section below the given path, so that the changing means effects the switching of the support members between the support section and the stock section.

Therefore, according to the third embodiment, the common (single) changing means effects the changing of the support position provided by the right and left support members and the switching of a plurality of kinds of supports between the support section and the stock sections, thus making it possible to cope with a variety of objects to be carried.

Further, in a fourth embodiment of a suspension conveyance system according to the invention, the supports have removable attaching pins to be inserted into the support section from above and support pins capable of having an object to be carried fitted thereon from above. These attaching pins and support pins are transversely spaced from each other.

Therefore, according to the fourth embodiment, when the object to be carried is unloaded from the support section by upwardly disengaging it from the support pins, the frictional resistance in the fitting region between the support pins and the object to be carried produces a force which tends to lift the supports to extract the attaching pins from the support section so as to disengage the supports. At this time, since the attaching pins and the support pins are transversely spaced from each other, the lifting direction of the supports during disengagement of the object to be carried becomes an arcuate direction with the center thereof located at the attaching pin, thus increasing the frictional resistance in the attaching pin. As a result, the disengagement of the supports can be automatically prevented.

BRIEF DESCRIPTION OF THE DRAWINGS

FIG. 11 is a plan view of the rear support member portion in the suspension conveyance system.

DETAILED DESCRIPTION OF THE PREFERRED EMBODIMENTS

Preferred embodiments of the invention will now be described below with reference to the drawings.

Figure 3:
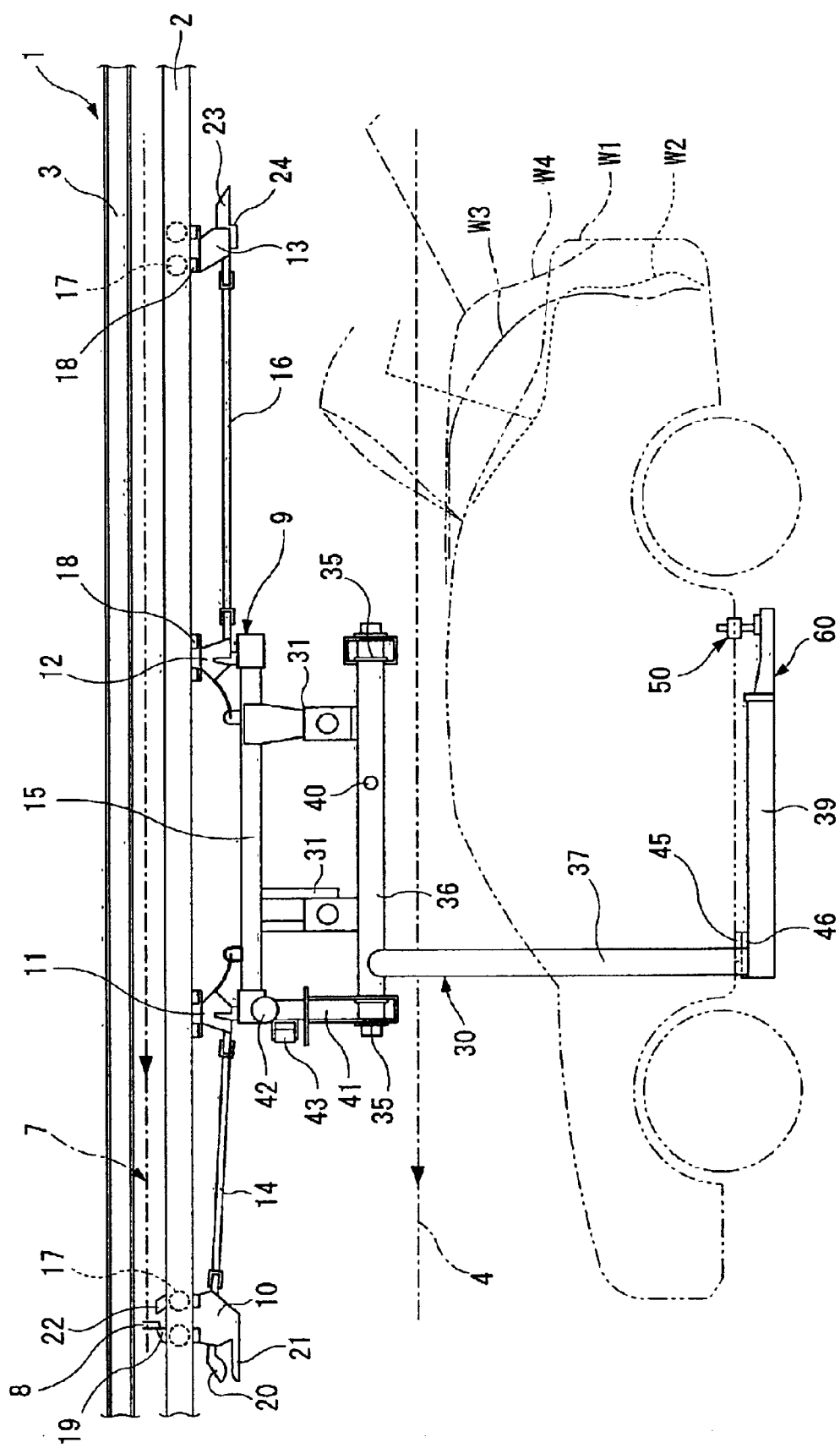
FIG. 3 is a side view of a movable body portion in the suspension conveyance system.
Figure 4:
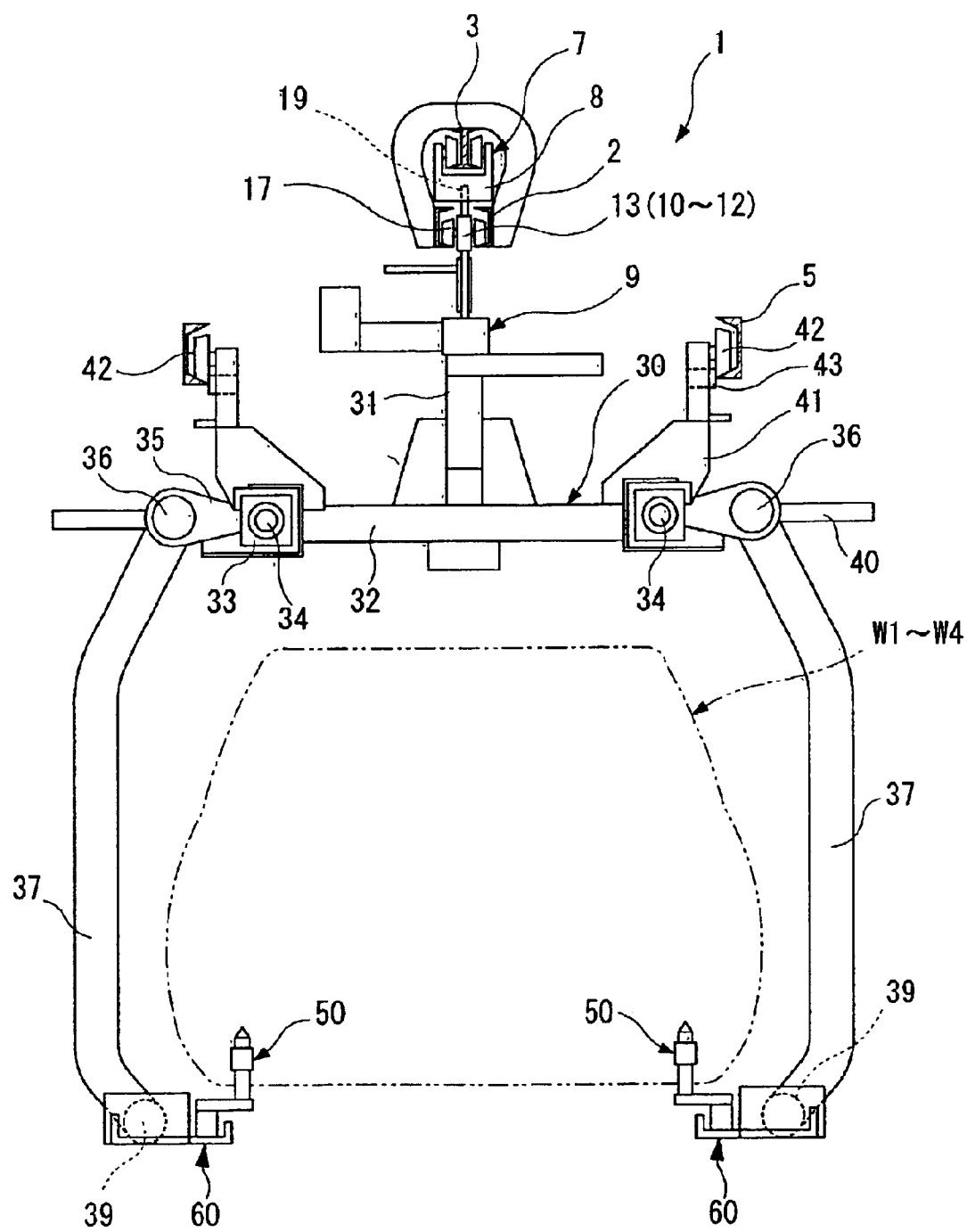
FIG. 4 is a rear view of the movable body portion in the suspension conveyance system.

In FIGS. 3 and 4, the numeral 1 denotes a suspension carrying means comprising a trolley guide rail 2, a driving unit rail 3 laid above the trolley guide rail 2, a trolley device 9 (an example of a movable body) supported and guided by the trolley guide rail 2 and movable on a given path 4, a hanger device (an example of a support section for an object to be carried) 30 disposed on the trolley device 9, a driving unit (chain conveyor or the like) 7 supported and guided by the driving unit rail 3 and the like.

The trolley device 9 comprises a front trolley 10, a pair of front and rear free trolleys 11 and 12, a rear trolley 13, a front frame 14 interconnecting the front trolley 10 and the free trolley 11, an intermediate frame 15 interconnecting the free trolleys 11 and 12, a rear frame 16 interconnecting the free trolley 12 and rear trolley 13 or the like. Each of the trolleys 10–13 is provided with a guide wheel 17 and a transverse swing preventing wheel 18, through which the trolleys are supported and guided by the trolley guide rail 2.

The front trolley 10 is liftably provided with a driven projection 19 removably engageable with a transmission projection 8 from the driving unit 7, and has a forwardly extending operating lever 20 attached at its intermediate portion thereto for vertical swing movement. The rear end of the operating lever 20 is connected to the lower end of the driven projection 19 through a pin. Therefore, the operating lever 20 and the driven projection 19 are operatively connected so that when the operating lever 20 lifts, the driven projection 19 lowers.

Further, the front trolley 10 is provided with an abutting portion 21 positioned below the operating lever 20, a hold dog 22 is positioned in the rear of the upper end of the front trolley 10 and rearwardly of the driven projection 19. The other rear trolley 13 has a cam tail 23 rearwardly extended therefrom for lifting the operating lever 20, the cam tail 23 having an abutted portion 24 formed in the lower portion thereof against which the abutting portion 21 is capable of abutting.

The hanger device 30 comprises a frame body 32, resembling a flat frame, attached to the intermediate frame 15 through connecting members 31, longitudinal shafts 34 attached to the right and left ends of the frame body 32 through bearings 33 so that they are rotatable around the longitudinal axes extending in the direction of the given path 4, brackets 35 laterally extending from the front and rear portions of these longitudinal shafts 34, pipe-like upper longitudinal members 36 connected between the outer ends of these brackets, pipe-like vertical members 37 connected at their upper ends to the front portions of these upper longitudinal members 36, pipe-like lower longitudinal members 39 rearwardly extending from below these vertical members 37 through brackets or the like.

In this case, a hanger section, L-shaped as seen in a side view, is formed by the vertical members 37, lower longitudinal members 39 and the like. And the upper longitudinal member 36 has an operated portion 40 outwardly projecting therefrom to be used for opening/closing operation and the like. In addition, brackets 41 are upwardly extended from the right and left sides of the front portion of the frame body 32, these brackets 41 being provided at their upper portions with guide rollers 42 and transverse swing preventing rollers 43 which are supported and guided by swing preventing rails 5 laid along the given path 4.

The right and left lower longitudinal members 39, which are the lower portion of the hanger device 30, are provided with front and rear supports 45 and 50 for supporting, from below, the object to be carried. In this case, the front supports 45, which are fixed in position, each are disposed on a bracket 46 inwardly extending from the front of the lower longitudinal member 39. Further, the rear support 50 is disposed such that the support position can be changed with respect to a support disposed section 60 installed at the rear end of the lower longitudinal member 39 (i.e., installed on the hanger device 30 side).

Figure 5:
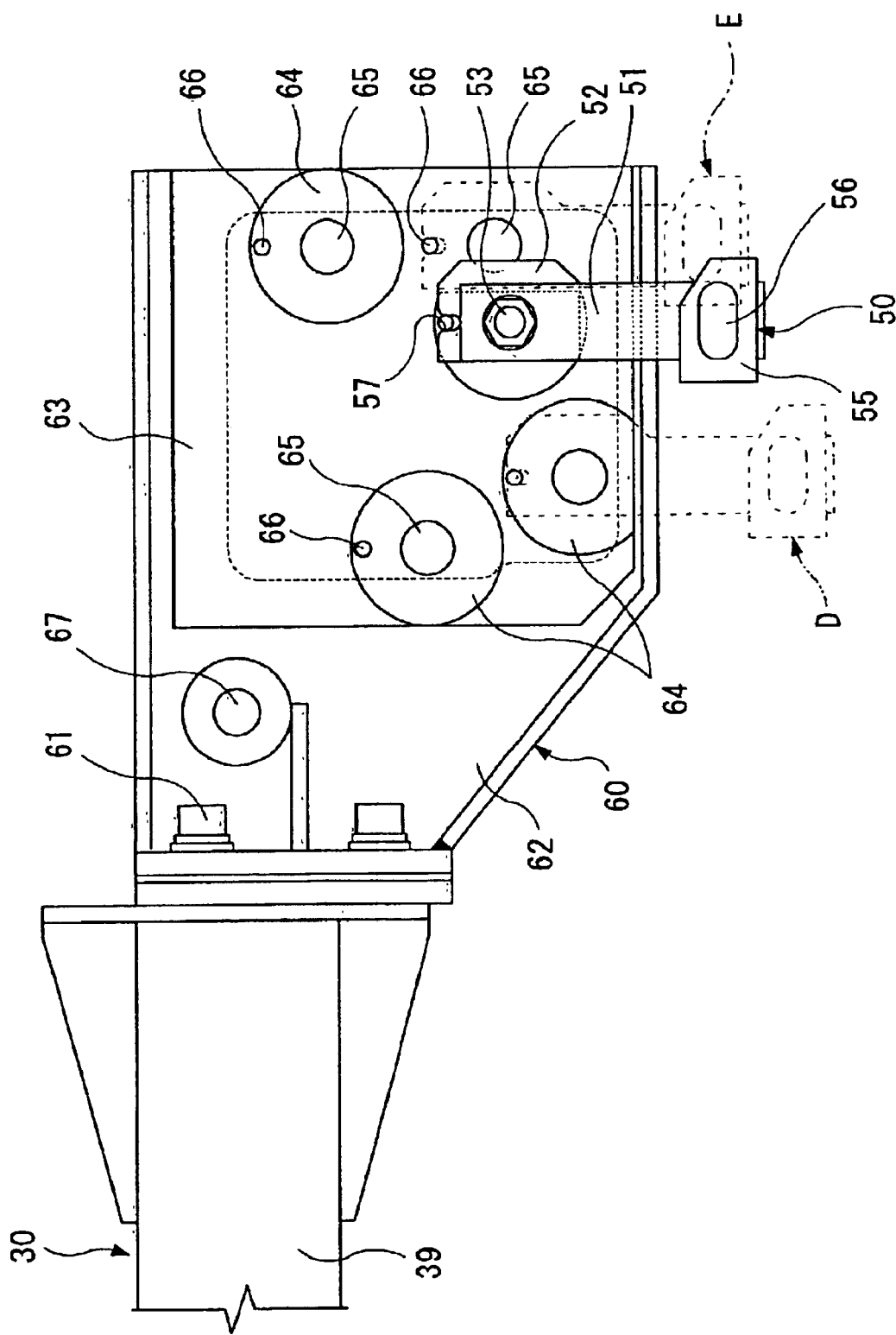
FIG. 5 is a plan view of a support member disposed portion in the suspension conveyance system.
Figure 6:
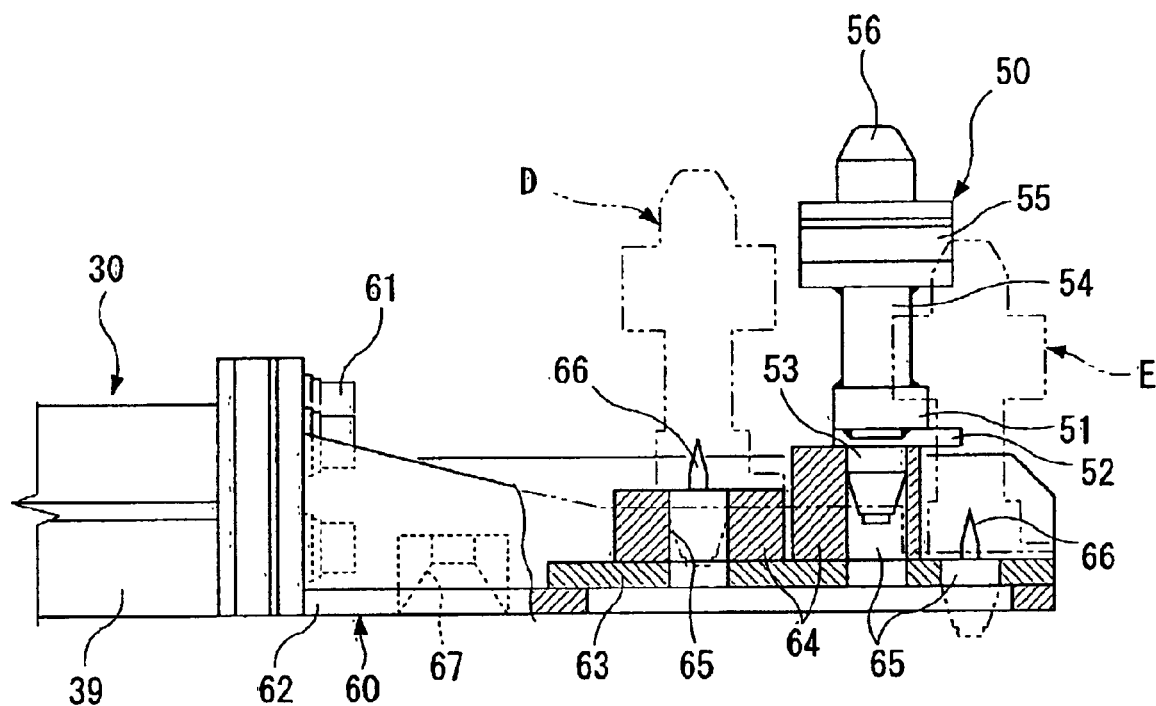
FIG. 6 is a side view, partly broken away, of the support member disposed portion in the suspension conveyance system.
Figure 7:
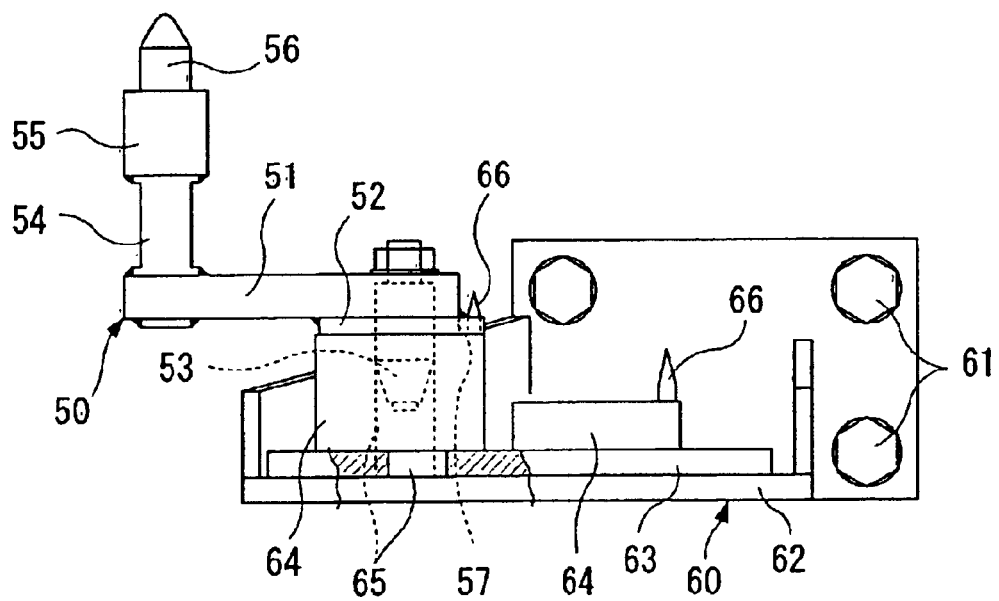
FIG. 7 is a rear view, partly broken away, of the support member disposed portion in the suspension conveyance system.

That is, the support disposed section 60, as shown in FIGS. 5–7, comprises a flat frame-like bracket 62 removably connected to the rear end of the lower longitudinal member 39 through fasteners 61, a base plate 63 disposed on the bracket 62, receiving bodies 64 disposed at a plurality of predetermined places on the base plate 63 and the like. In this case, the receiving body 64, which is in the form of a block, has pin receiving holes 65 formed in the central portion thereof and a positioning pin or pins 66 erected adjacent the outer edge thereof. In addition, part of the pin receiving hole 65 is formed directly in the base plate 63.

The rear support 50, as shown in FIGS. 5–7, and 9–11, comprises a base member 51 in the form of a plate, a patch body 52 connected to the lower surface of one end of the base member 51, an attaching pin 53 positioned over a region extending from one end of the base member 51 to the patch body 52 and insertable at its lower end into the pin receiving hole 65 in the receiving body 64 (on the support section side) from above, an upwardly extending pin bracket 54 connected to the other end of the base member 51, a support pin 56 erected on the upper end of the pin bracket 54 through an attaching member 55 and the like.

In this case, the edge of the patch body 52 is formed with a recess 57 with which the positioning pins 66 are engageable. Further, the support pin 56 is elliptic in section and is capable of having an object to be carried fitted thereon from above. And in the rear support 50, the attaching pin 53 and the support pin 56 are transversely spaced a predetermined distance L apart from each other.

In addition, as for the rear supports 50, symmetrical ones are prepared as a one-kind in one-set, and according to the kinds of objects to be carried, two kinds (a plurality of kinds) are prepared. That is, as shown, for example, in FIG. 8, symmetrical rear supports 50A of another kind which differ both in the planar shape of the base member 51 and in the predetermined distance L with respect to the rear support 50 are prepared as a one-kind in one-set.

Figure 1:
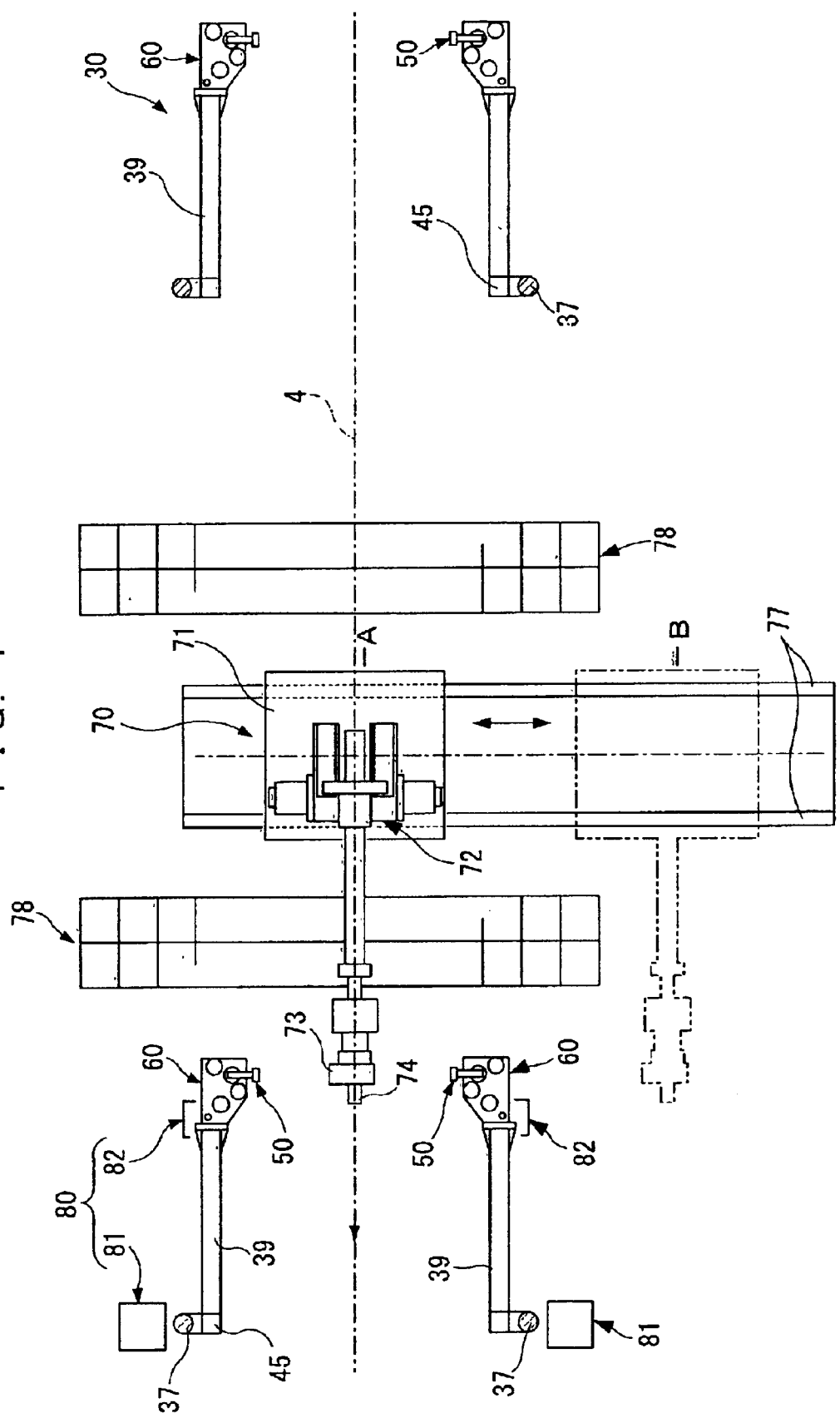
FIG. 1, which shows an embodiment of the invention, is a plan view of a changing means portion in a suspension conveyance system.
Figure 2:
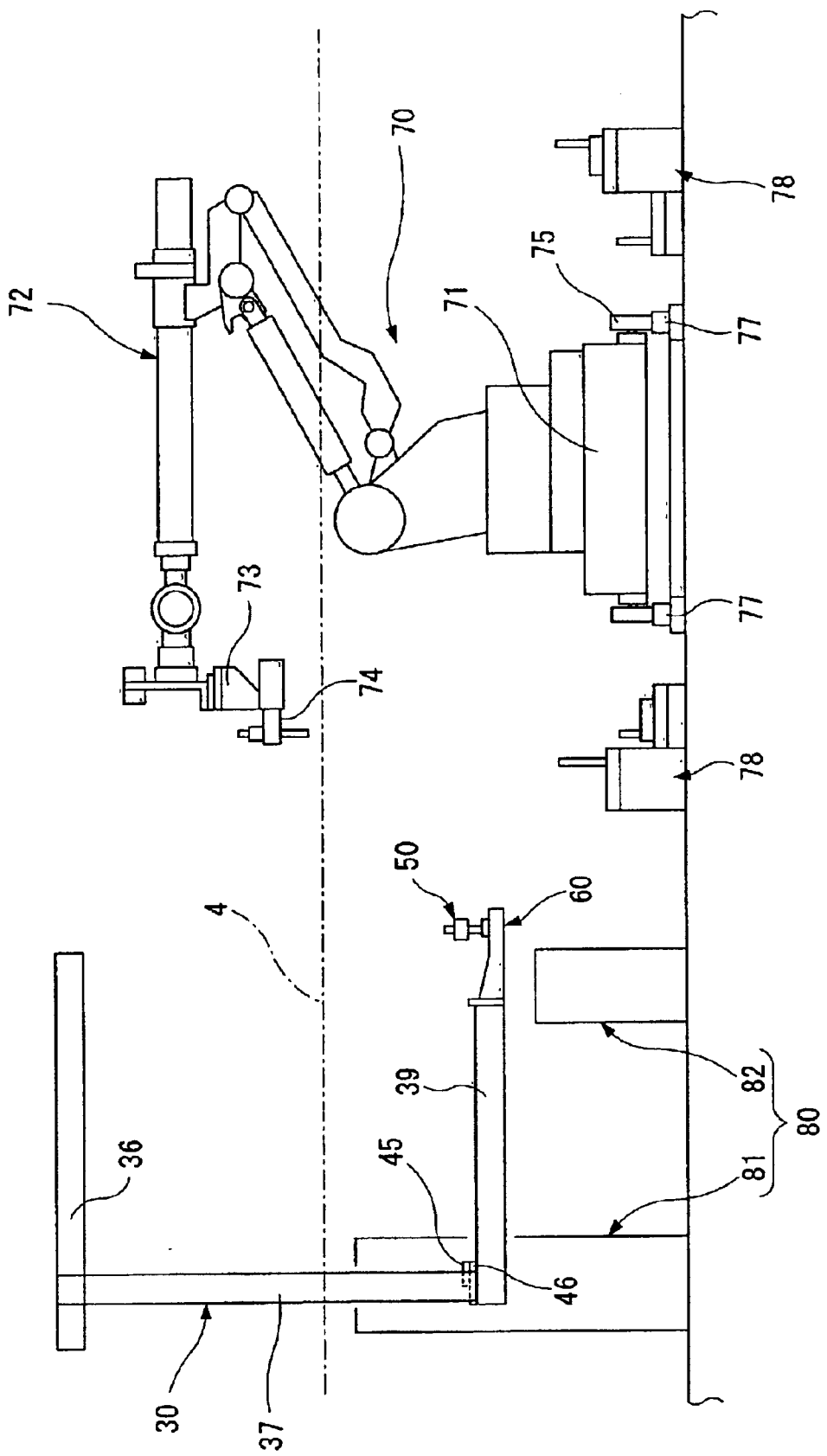
FIG. 2 is a side view of the changing means portion in the suspension conveyance system.

As shown in FIGS. 1 and 2, the given path 4 is provided with a changing means 70 positioned between the right and left rear supports 50 and 50A for changing the support position provided by these rear supports 50 and 50A. That is, the changing means 70 comprises a base block 71, a robotic device 72 disposed on the base block 71, a clamp section 74 disposed on the front end arm section 73 of the robotic device 72 and the like. In this case, the front end arm section 73 is capable of moving vertically, transversely, longitudinally, and so on. And the clamp section 74 is capable of claming the pin bracket 54 in the rear supports 50 and 50A.

The base block 71 is mounted on floor rails 77 laid to extend in a direction orthogonal to the direction of the given path 4 through a group of drive type wheels 75; thus, the changing means 70 is capable of moving between the operating position A in the given path 4 and the retreat position B outside the given path 4.

Stock sections 78 for the rear supports 50 and 50A are disposed at positions below the given path 4 and opposed to the changing means 70. In this case, the stock sections 78 are disposed on both sides of and equally spaced from the changing means 70, which is now moved to the operating position A. The front and rear stock sections 78 each have two rows, front and rear, (a single row or a plurality of rows), each row having many sections for stocking and are set at a height to avoid collision with the hanger device 30. Therefore, the rear supports 50 and 50A can be switched between the hanger device (support section) 30 and the stock sections 78.

In the given path 4, there is provided a positioning means 80 for positioning the hanger device (support section) 30 when the trolley device 9 is stopped at a position where it is opposed to the changing means 70. That is, the positioning means 80 comprises a pair of right and left clamps 81 capable of clamping the vertical members 37 in the hanger device 30, an engaging/disengaging device 82 having a pin capable of engaging/disengaging a positioning hole 67 (see FIGS. 5 and 6) formed in a bracket 62 in the support disposed section 60 and the like.

The operation in the embodiment described above will now be described. In addition, the car body of an automobile, which is an example of an object to be carried, consists of, for example, of a first car body W1, a second car body W2, a third car body W3, a fourth car body W4, and the like.

According to the suspension conveyance system 1 of the construction described above, normally, the traveling of the trolley device 9, as shown in FIG. 3, is effected by the transmission projection 8 engaging the driven projection 19. Since the hold dog 22 abuts against such transmission projection 8, uncontrolled traveling thereof is prevented. Further, the car bodies W1–W4 are supported at four points through the supports 45, 50 and 50A of the hanger 6 during normal traveling. At this time, a car body of a certain kind, for example, is supported and in the rear, as shown in solid line in FIGS. 5 and 6, the rear support 50 is set in the longitudinal intermediate position.

In this state, when the rear supports 50 are to be longitudinally displaced as shown in phantom lines D and E in FIGS. 5 and 6 so as to carry a different kind of car body, first, the trolley device 9 is caused to travel until it is stopped with the hanger device 30, now empty, opposed to the changing means 70 and positioning means 80.

At this time, the changing means 70 is positioned in the operating position A, as shown in solid line in FIG. 1, whereas in the empty hanger device 30, the portions below the frame 32, that is, the vertical members 37 and the like are bifurcated, so that these vertical members 37 and the like pass by both sides of the changing means 70. This allows the empty hanger device 30 to stop in opposed relationship to the changing means 70 and positioning means 80 without colliding with the changing means 70.

After the hanger device 30 has thus been stopped, first, both vertical member 37 are clamped by both clamp devices 81 of the positioning means 80, and then the pin of the engaging/disengaging device 82 is lifted to engage the positioning hole 67, from below, which is formed in the support disposed section 60. Thereby, the positioning (swing prevention) of the hanger device 30 is effected by the positioning means 80.

In this state, the operator operates the robotic device 72 of the changing means 70 while freely moving its front end arm section 73 vertically, transversely, longitudinally, and so on. Thereby, first, the clamp section 74 provided on the front arm section 73, as shown in solid line in FIG. 5, clamps the pin bracket 54 in the rear supports 50 set in the longitudinal intermediate position, and then lifts the rear supports 50 to withdraw the attaching pin 53 from the pin receiving hole 65.

Then, after the rear supports 50 have been transversely moved until the attaching pin 53 is opposed to an intended pin receiving hole 65 from above, the rear supports 50 are lowered to insert the attaching pin 53 in the pin receiving hole 65. During this insertion, the recess 57 formed in the edge of the patch body 52 is engaged with the positioning pin 66 from above; thus, the rear supports 50 are capable of positioning simultaneously with changing the support position. Thereby, the rear supports 50 can be set by being longitudinally displaced as shown in phantom lines D and E in FIGS. 5 and 6; thus, car bodies of two other kinds can be supported.

As described above, after the support position provided by the rear supports 50 has been changed by the changing means 70, both clamping devices 81 and engaging/disengaging device 82 of the positioning means 80 are reversely operated to open the positioning (swing prevention) of the hanger device 30, thereby completing a series of operations.

Figure 8:
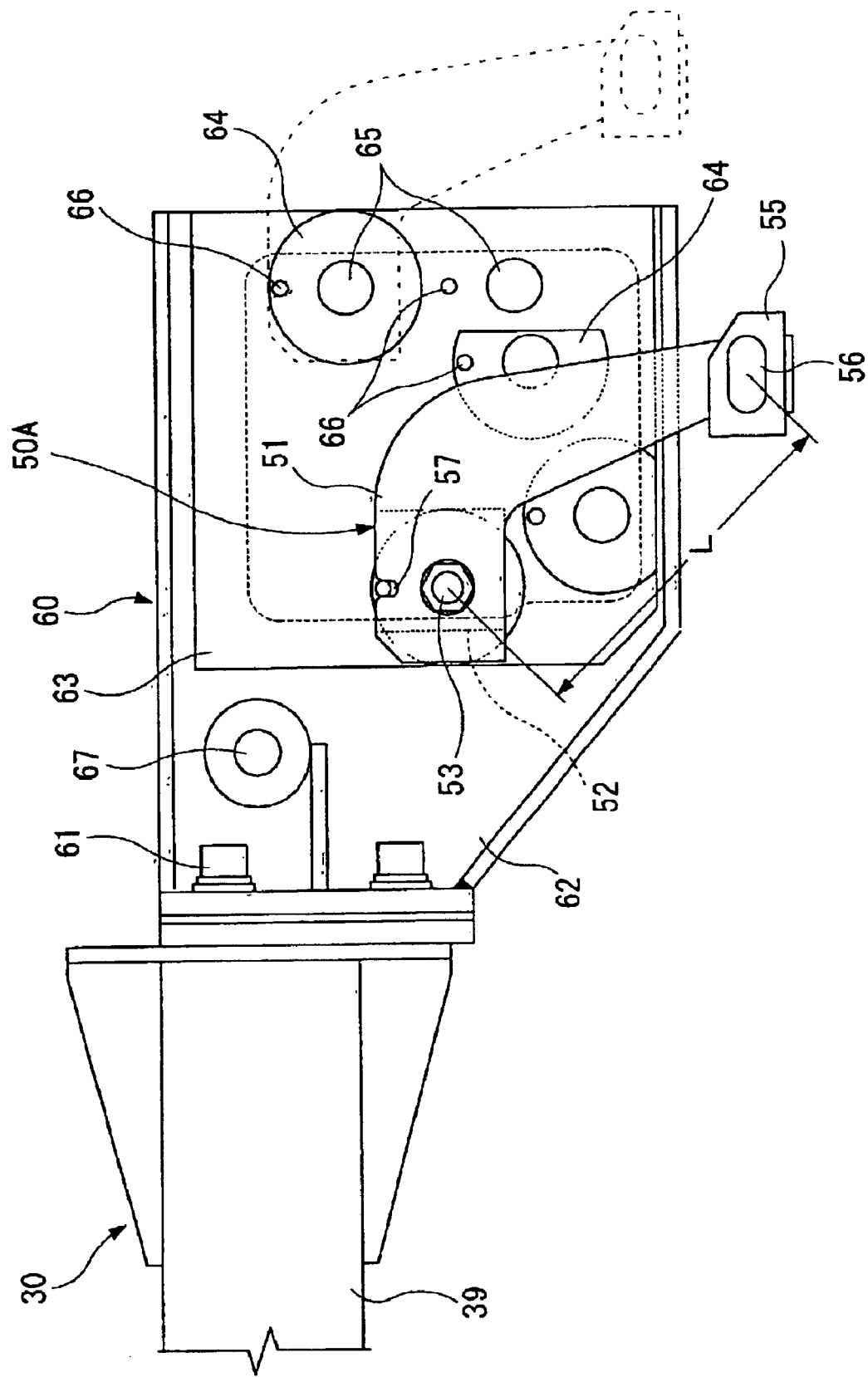
FIG. 8 is a plan view of another support member disposed portion in the suspension conveyance system.
Figure 9:
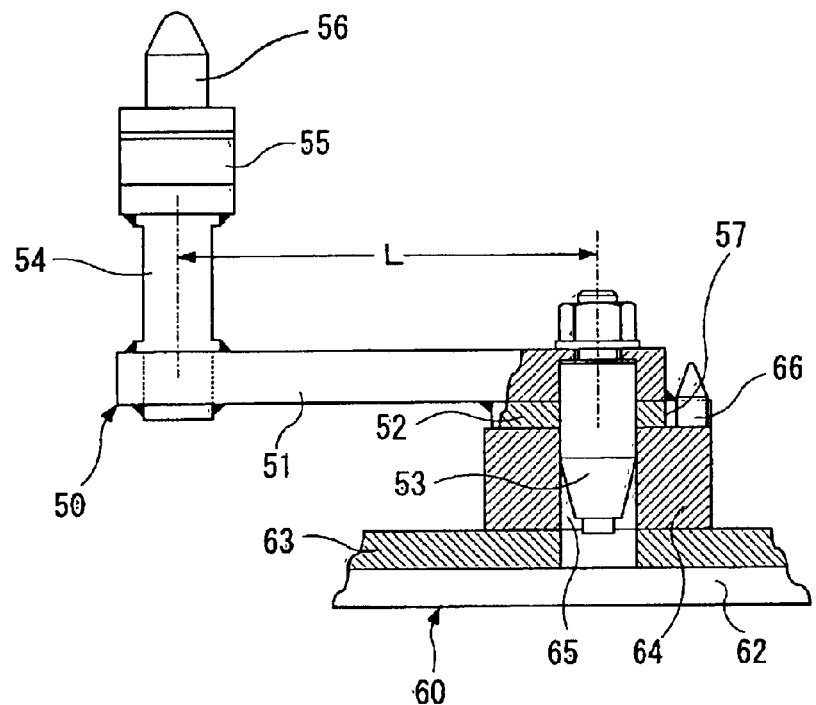
FIG. 9 is a rear view, partly broken away, a rear support member portion in the suspension conveyance system.
Figure 10:
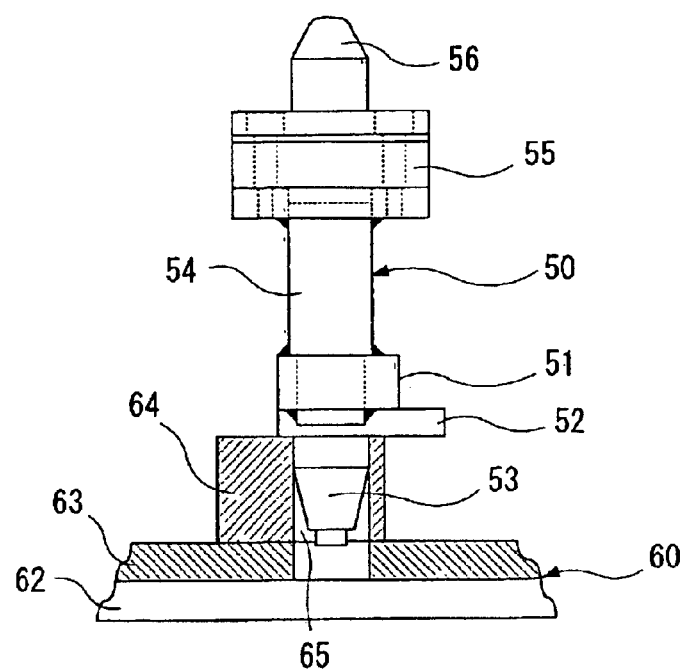
FIG. 10 is a side view, partly broken away, of the rear support member portion in the suspension conveyance system.

The support position provided by the right and left rear supports 50 can be changed in this manner by the changing means 70, and similarly, as shown in FIG. 8, the support position provided by the right and left rear supports 50A can be changed between the solid and phantom lines by the changing means 70.

As described above, after the hanger device 30 has been stopped in opposed relationship to the changing means 70 and positioning means 80, the rear supports 50 and 50A can be switched between the hanger device 30 and the stock section 78 by operating the changing means 70. That is, the robotic device 72 of the changing means 70 is operated to release the rear supports 50 (50A) set on the support disposed section 60 side, then to store them in predetermined locations in the stock section 78, to take out the intended rear supports 50A (50) stored in the stock section 78, and set them at the intended position on the support disposed section 60 side.

As described above, the support position provided by the right and left rear supports 50 and 50A can be changed by the common (single) changing means 70, and similarly, the rear supports 50 and 50A can be switched between the hanger device 30 and the stock section 78 by the common changing means 70.

Thus, either the rear supports 50 or the rear supports 50A are set in the intended position, thereby supporting the car body of the intended kind of automobile between them and the front supports 45, that is, supporting the car body by the hanger device 30, and carrying the same. At this time, the car body is fitted on the support pins 56 of the rear support 50 and 50A from above and then abutted against the attaching members 55, whereby the car body is supported in a position-controlled manner.

And after various operations have been completed while carrying the car body, the car body is unloaded from the hanger device 30 at a predetermined position, which unloading is effected by lifting the car body to upwardly disengage it from the support pins 56. At this time, the rear supports 50 and 50A are lifted as by frictional resistance in the fitting region between the support pins 56 and the car body, and the attaching pins 53 are extracted from the pin receiving holes 65 in the receiving sections 64, thus producing a force which causes disengagement of the rear supports 50 and 50A.

However, since the rear supports 50 and 50A have the attaching pins 53 and support pins 56 transversely spaced the predetermined distance L apart, the lifting direction of the rear supports 50 and 50A during car body disengagement becomes an arcuate direction with its center located at the attaching pin 53, thus increasing the frictional resistance produced between the inner peripheral surface of the pin receiving hole 65 and the outer peripheral surface of the attaching pin 53, so that the disengagement of the rear supports 50 and 50A is automatically prevented.

The changing means 70, as shown in solid line in FIG. 1, performs the operation, in the operating position A in the given path 4, of changing the support position provided by the rear supports 50 and 50A, as described above, but when it does not perform such operation, it may be moved to the retreat position B outside the given path 4 through the base block 71, as shown in phantom line in FIG. 1. Such movement to the retreat position B allows the maintenance, inspection, repair and the like, of the changing means 70 to be performed without any trouble and without stopping the movement (empty movement, real test movement or the like) of the trolley device 9 side on the given path 4.

In the embodiment described above, the trolley device 9 is shown as a movable body; however, it may be a self-propelled body in the form of an electric train supported and guided by rails. Further, car bodies W1–W4 are shown as an object to be carried; however, they may be workpieces to be painted.

In the embodiment described above, the front supports 45 are fixed while the support position provided by the rear supports 50 and 50A is alterable; however, there may be used a different type in which rear supports are fixed while the support position provided by the front supports is alterable, or another type in which the support positions provided by the front and rear supports are alterable.

In the embodiment described above, the type is shown in which the robotic device 72 is used as the changing means 70 for changing the support position provided by the rear supports 50 and 50A; however, a different type may be used.

In the embodiment described above, the changing means 70 is constructed to be movable between the operating position A in the given path 4 and the retreat position B outside the given path 4; however, it may be of a type in which it is fixed in the operating position A in the given path 4.

In the embodiment described above, the positioning means 80 is installed for positioning the hanger device 30 when the trolley device 9 is stopped at a position where it is opposed to the changing means 70 in the given path 4; however, the positioning means 80 may be omitted in the case of a type which causes less swing or the like to the hanger device 30.

In the embodiment described above, the stock sections 78 for the rear supports 50 and 50A are disposed below the given path 4 so that the rear supports 50 and 50A may be switched between the hanger device 30 and the stock sections 78 by the changing means 70; however, a different type may be used in which only the changing means 70 changes the support position provided by the rear supports with respect to the hanger device 30, with no stock sections prepared.

In the embodiment described above, the rear supports 50 and 50A have the attaching pins 53 provided thereon which are disposed on the side of the hanger device 30 for insertion from above and the support pins 56 provided thereon which are capable of having an object to be carried fitted thereon from above. These, attaching pins and support pins are transversely spaced from each other; however the rear supports 50 and 50A may be of various types including one in which the attaching pins 53 and the support pins 56 are coaxial.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. A suspension conveyance system comprising:
    a movable body movable on a given path, said movable body including a support section for carrying an object to be carried; and
    supports for supporting an object from below, said supports being disposed in a lower portion of said support section on right and left sides thereof, such that a support position of the object can be changed, wherein floor rails are laid to extend in a direction orthogonal to the direction of the given path, said floor rails including changing means for changing a support position provided by the supports, said changing means being movable between an operating position in the given path and a retreat position outside the given path.

2. A suspension conveyance system as set forth in claim 1, wherein, a positioning apparatus is provided in said given path for positioning the support section when the movable body is stopped at a position where it is opposed to the changing apparatus.

3. A suspension conveyance system as set forth in claim 1, wherein stock sections for the support section are provided below the given path so that the supports may be switched between the support section and the stock sections by the changing apparatus.

4. A suspension conveyance system as set forth in claim 1, wherein the supports have attaching pins insertable in a pin receiving hole in the support section from above and support pins capable of having an object to be carried fitted thereon from above, said system further comprising a base member through which said attaching pins and said support pins are transversely spaced from each other.

* * * * *